United States Patent [19]

Nordkvist et al.

[11] 4,221,283
[45] Sep. 9, 1980

[54] DEVICE FOR FACILITATING GEAR CHANGING IN GEAR BOXES

[75] Inventors: Kjell E. Nordkvist; Lars H. Skog, both of Södertälje, Sweden

[73] Assignee: Saab-Scania Aktiebolag, Södertälje, Sweden

[21] Appl. No.: 902,745

[22] Filed: May 3, 1978

[30] Foreign Application Priority Data

May 9, 1977 [SE] Sweden .............................. 7705355

[51] Int. Cl.² ........................................ B60K 41/26
[52] U.S. Cl. .................................. 192/4 C; 74/339; 74/411.5; 192/4 A
[58] Field of Search ................. 192/4 A, 4 C; 74/339, 74/411.5

[56] References Cited

U.S. PATENT DOCUMENTS

| 2,606,461 | 8/1952 | Herndon | 192/4 C X |
| 2,862,398 | 12/1958 | Zeidler et al. | 192/4 A X |
| 2,993,574 | 7/1961 | Gardner | 192/4 A |

Primary Examiner—Allan D. Herrmann
Attorney, Agent, or Firm—Cushman, Darby & Cushman

[57] ABSTRACT

An arrangement for facilitating engaging an unsynchronized reverse gear in a motor vehicle manual gearbox, where at least one forward gear is provided with a synchronizing means. A gripping means connected to the selector actuating means obtains force-transmitting connection with the forward gear selector during a part of the changing movement into reverse gear. Said force-transmitting connection is resilient in the shifting direction of the selector.

6 Claims, 7 Drawing Figures

DEVICE FOR FACILITATING GEAR CHANGING IN GEAR BOXES

The present invention relates to arrangements for facilitating engaging a reverse gear arranged without synchronizing means in a gearbox for motor vehicles, operated by a gear lever.

In manual gearboxes for motor vehicles, all the forward gears are often synchronized, while the reverse gear is usually unsynchronized. When engaging an unsynchronized reverse gear, there is often severe noise when gears rotating at different speeds are urged into engagement. This occurs particularly when reverse gear is engaged quickly, since inertia in transmission parts of the gearbox results in continued rotation of these parts for a limited time after disengaging transmission between engine and gearbox. An attempt, by axial displacement of an idler gear in the reverse gear, to establish gear coaction between a rotating reverse pinion and a practically stationary reverse gear rigidly connected to the outgoing shaft of the gearbox, results in direct end-to-end tooth contact which, apart from disturbing scraping noises, also results in deformation damage to the teeth in question.

The present invention has the object of providing an arrangement for facilitating engaging a reverse gear arranged without synchronizing means in a gearbox for motor vehicles, operated manually by a gear change lever, said arrangement ensuring simply and cheaply that a synchronizer in a synchronizing means for a forward gear in the gearbox is actuated and disengaged before tooth contact is established when engaging the reverse gear.

In the inventive arrangement the gears are engaged and disengaged by the gear lever via at least one selector actuator rod and at least one selector actuator coacting therewith, a shifting movement for engaging a gear consisting of a selection step and an engagement step. The selection step involves a movement of the selector actuating means in a first plane, during which movement the selector actuator is moved into engagement with a selector for the gear in question, and the engagement step involves a movement of a selector actuating means in a second plane, during which movement the selector is slid to engage the gear in question, the selector for the forward gear transmitting the engaging movement via the synchronizing means. A gripping means connected to the selector actuating means is arranged to provide force-transmitting contact with the forward gear selector during a portion of the selection step for the reverse gear engaging movement, and to give the selector a sliding movement so that the forward gear synchronizer is actuated, thereby braking the reverse gear before the reverse gear engagement step is actuated. The arrangement according to the invention is characterized in that the force-transmitting connection between the gripping means and the selector is sprung in the direction of motion of the latter. A knocking action on the synchronizer is hereby dampened during rapid engagement of reverse gear, and the sprung connection provides desired suppleness in actuating the synchronizer, which is advantageous from the points of view of function and working life.

In the inventive arrangement, actuation and disengagement of the synchronizer of the synchronizing means takes place during the selection step, which in practice means that the synchronizer is disengaged when there is contact between the teeth of the reverse pinion and remaining reverse gears during the subsequent engagement step.

Remaining distinguishing features of the inventive arrangement are apparent from the following description and claims.

Two embodiments exemplifying the invention will now be described in detail while referring to the attached figures, of which FIG. 1 schematically shows an inventive arrangement for a motor vehicle gearbox. In order better to illustrate reverse gear engagement, certain details of the gearbox and gear changing mechanism proper are shown in the same plane.

Figure 1:
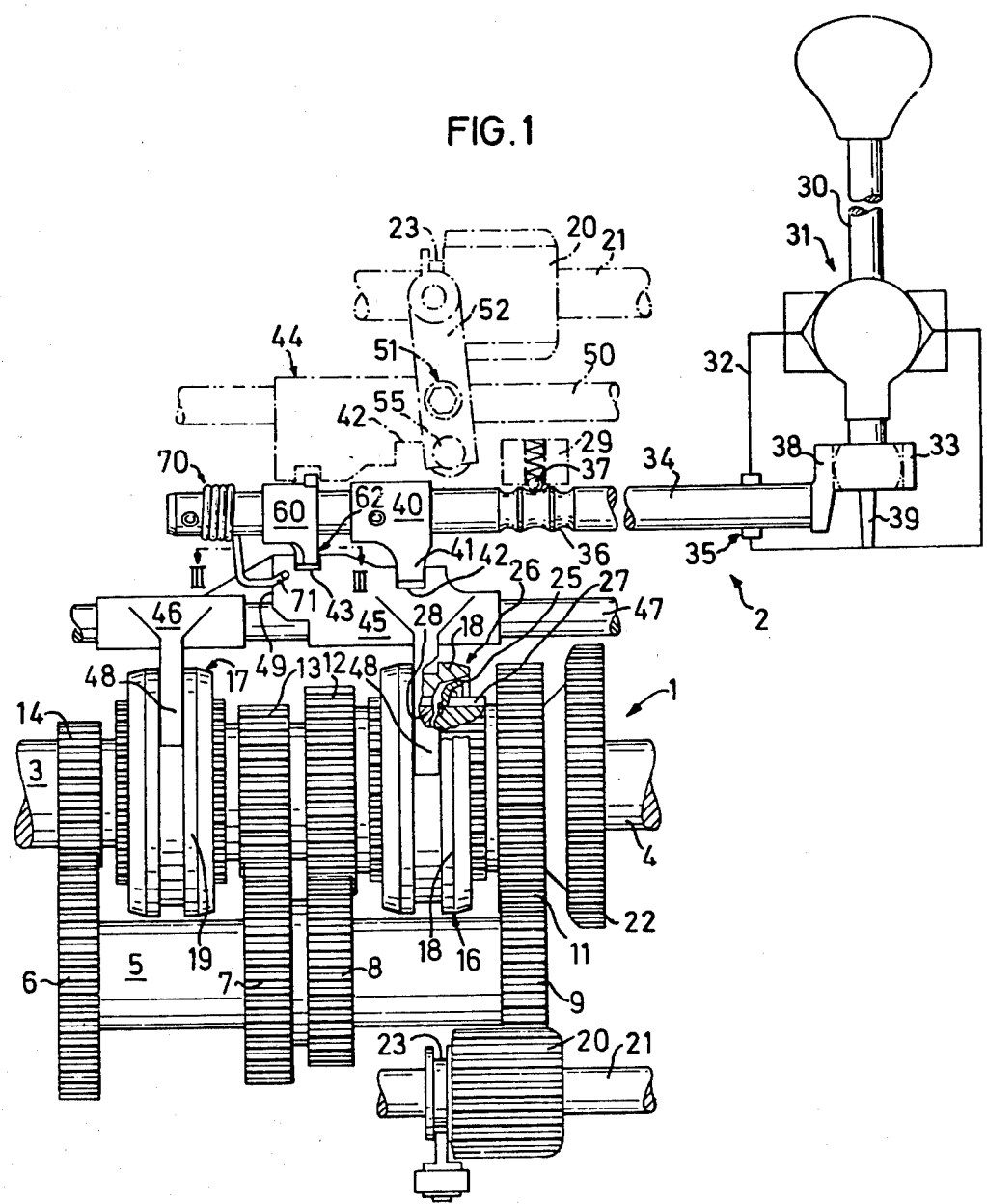

FIG. 1 shows the inventive arrangement applied to a known gearbox structure comprising a gearbox 1 and a gear shift mechanism 2 associated therewith. The gearbox 1 is conventionally constructed with an input shaft 3, which is connected via a main clutch (not shown) to an internal combustion engine (also not shown), there being an output shaft 4 concentrically arranged with respect to the input shaft 3, the shaft 4 being connected to a final drive (not shown), there being a layshift 5 arranged parallel to said shafts 3,4. A plurality of gears 6–9 are attached to the layshaft 5, these being in constant mesh with a plurality of gears 11–14 on the axis 3,4, the latter gears being nonrotatably connectable to the output shaft 4 by means of two conventional synchronizing means 16,17. The fixed connection of gears 11–14 to the output shaft 4 corresponds to first, second, third and fourth forward gears in the gearbox.

The synchronizing means 16,17, portions thereof essential to the invention being apparent from a cross-section through the upper part of the synchronizing means 16, have a conventional principle design and function. The synchronizing means 16 thus comprises an axially movable synchronizer hub 18 which, during engagement of first gear, is moved towards the gear 11, thereby first coacting with an axially spring-loaded baulk ring 25 non-rotatably connected to the gear 11, to form a synchronizer 26 which, while working under friction, successively adjusts the angular velocity of the gear 11 to that of the output shaft 4. Continued displacement of the hub 18 causes internal teeth in said hub to engage with teeth on a gear ring 27 intrinsic with the gear 11 so as to transmit torque between the gear ring 27 and a hub 28 non-rotatably attached to the shaft 4. First gear is engaged when the gear 11 is coupled to the output shaft 4.

The layshaft 5 is caused to rotate by the gear 6 engaging a pinion 14 attached to the input shaft 3. A reverse idler gear 20, slidingly mounted on a shaft 21 parallel to the layshaft 5 is in continuous mesh with a laygear 9 on the layshaft 5. The reverse idler gear 20 has a width sufficient to maintain said gear engagement even when it is slid on the shaft 21 to engagement with a reverse gear 22 on the output shaft 4 when reverse gear is engaged.

The gears are engaged and disengaged manually with the help of a gear changing mechanism 2. Included in this there is a manually operable gear change lever 30 which, via a ball-and-socket joint 31, is movably mounted in a gear change lever housing 32 attached to the vehicle floor (not shown). The lower part of the gear change lever 30 is mounted, via a ball in a socket 33 made at the end of a crank 38, at one end of a selector actuator rod 34. Said rod 34 extends parallel to shafts 3,5 in the gearbox and passes through a mounting 35 in the gear change lever housing 32 and a mounting (not shown) in a gearbox casing (not shown). The mountings allow both axial and rotational movement for the rod 34.

Resulting from the excentric placing of the socket 33 relative to the selector actuator rod 34, the rod 34 is given rotating movement when the gear change lever 30 is moved in a plane substantially at right angles to that of the figure, while for movements of the lever 30 substantially in the plane of the figure the rod 34 is given axial sliding movement. The lower end of the lever 30 is made with a spring-loaded pin 39 coacting with a boss (not shown) at the bottom of the gear change lever housing 32 to provide a stop, which will yield after a certain application of force, to engage reverse gear.

The selector actuator rod 34 is provided with three concave grooves 36 in spaced relationship adjacent each other to coact with a spring-loaded ball 37 accommmodated in a bore in a portion 29 of the gearbox casing. Said portion 29 is chain-dotted in FIG. 1, because it is not shown in its proper plane. The spring loading on the ball 37 is so adjusted that a relatively light application of force on the gear change lever 30 in the plane of the figure is sufficient to press up the ball 37, so that it can roll over to an adjacent groove 36 for axial movement of the rod 34. The coaction of ball 37 and grooves 36 serves to indicate the gear positions, thus contributing to keeping a gear engaged.

A selector actuator 40 is fixedly mounted on the selector actuator rod 34. The actuator 40 is formed with a finger 41 which, dependent on the amount of turn in the rod 34, is arranged to engage in a recess 42 provided for the purpose in any one of three selectors 44,45,46. The selector 44, indicated by chain-dotted lines in FIG. 1, is intended to engage and disengage reverse gear. The selector 44 is slidably mounted on a first selector rod 50 extending parallel to shafts 3,5 and selector actuator rod 34 in the gearbox 1. A mounting 51 for a lever 52 is attached to the rod 50 by means of a screw. One end of the lever is provided with a semi-circular recess engaging against a pin 55 projecting from the selector 44 to allow relative pivoting movements. The other end of the lever 52 is provided with a guide pin 56 engagaing in a groove 23 formed at one end of the reverse idler gear 20. When the selector 44 is slid axially during engagement and disengagement of the reverse gear, the lever 52 is pivoted about the mounting 51 on the rod 50, whereby the guide pin 56 at the other end of the lever 52 slides the reverse idler gear 20 in the opposite direction relative to that of the selector 44.

The selectors 45,46 are slidably mounted on a second selector rod 47, arranged in the gearbox 1 parallel to the first selector rod 50. The selectors 45,46 are each provided with a fork 48 engaging the respective hubs 18,19 on the synchronizing means 16,17. The selectors 45,46 are further made with two recesses 42,43, of which the recess 42 is intended to coact at a certain angular position of the selector actuator rod 34 with the finger 41 of the selector actuator 40, while the recess 43 coacts with a shift lock 60. The selector 46 is made with a projecting arm extending along the rod 47. In FIG. 1, the arm and its recesses 42,43 assume a rearward obscure position, and in FIG. 2 the arm assumes a position to the left of the selector 45 for coaction with the finger 41 of the actuator 40 and the shift lock 60.

The shift lock 60, non-rotatably but axially movable on the selector actuator rod 34, is provided with a low and a high cam 61 and 62, respectively. The low cam 61 runs in a groove in a guide pin 63, attached to a portion 64 designed for it on the gearbox casing (see FIG. 2). The guide pin 63 allows the cam 61 movement on turning the shift lock 60 but retains the cam 61 and the lock 60 to the gearbox casing against the axial movements of the rod 34. The high cam 62 is intended to engage in the recesses 43 in the selectors 44,45,46. The cam 62 is further provided with a semi-circular recess 65 axially aligned with the finger 41 of the actuator 40, whereby free axial movement is enabled for the selector engaged by the actuator 40. The cam 62 prevents axial movement for remaining selectors, the shift lock 60 ensuring hereby that on changing gear, only one selector and thereby only one gear is actuated. The cam 62 also has two different widths merging one into the other. The wide cam part 66 is suited to the recess 43 in the selectors, and the narrow cam part 67 enables limited displacement of the selector in question when the recess 43 is engaged.

At the free end of the selector actuator rod 34 there is a helix compression wire spring 70. One end of the spring 70 is fixed to the rod 34 in a radial bore, while the other end extends tangentially from the rod 34 and forms, via two bends, a finger-like end portion 71. The end portion 71 is situated in a plane substantially parallel to the axial extension of the rod 34, and the end portion is furthermore inclined towards its plane of movement when the rod 34 is turned. The distance between the free end of the rod 34 and the end of the end portion 71 is greater than the corresponding distance to the end portion 49 of the selector 45. The end portion 71 has however a turning angle difference relative to the finger 41, such that when reverse gear is engaged there is an inventive coaction between the end portion 71 and the end edge 49 of the selector 45.

On changing gear, the selector actuator 40 is given both a turning and an axial movement, these being respectively denoted here by "selection step"and "engagement step".Engagement of reverse gear takes place by the selector actuator 40 being turned to engagement with the recess 42 in the reverse selector 44 during the selection step, whereafter the actuator 40 and thereby the selector 44 are slid axially to the left in FIG. 1 during the engagement step. For this, the lever 52 pivots about its fixed mounting 51, and the guide pin 56 on the other end of the lever slides the reverse idler gear 20 on the shaft 21 to engagement with reverse gear 22, i.e. reverse gear is now engaged. When the selector actuator 40 is turned to engagement with the reverse gear selector 44, it is accompanied by the shift lock 60 and the spring 70, which are non-rotatably attached to the selector actuator rod 34. It will be seen from FIGS. 3a, 3b and 3c how these means coact with the selector 45.

Figure 2:
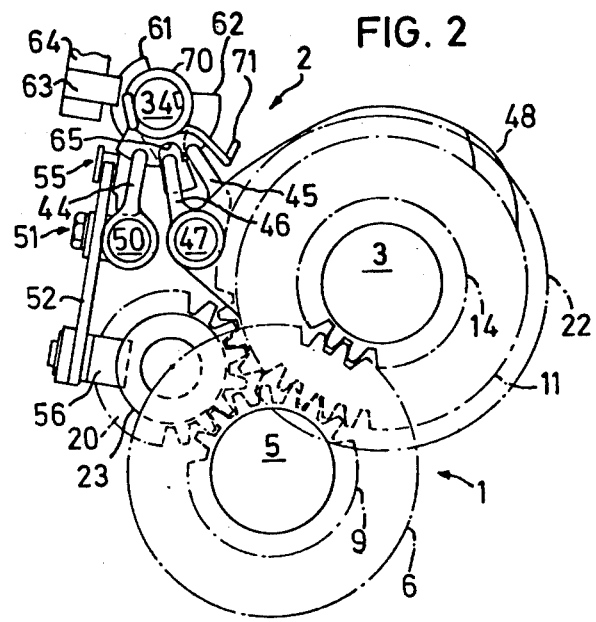
FIG. 2 shows an alteration of the arrangement shown in FIG. 1, the parts now assuming the positions they have in actual practice.
Figure 3A:
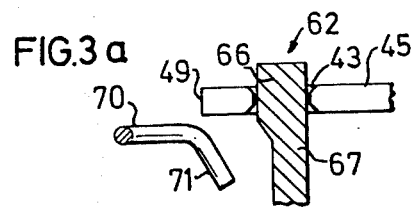
FIGS. 3a, 3b and 3c show a section III—III according to FIG. 1, for three separate positions during the engagement of reverse gear.
Figure 3B:
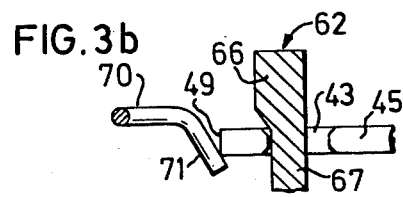
Figure 3C:
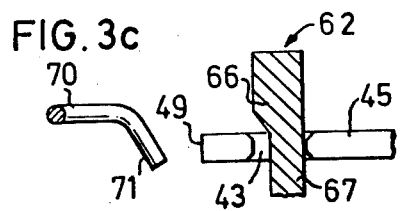

FIG. 3a shows the mutual relationship between the shift lock 60, the spring 70 and the selector 45 in the turning position of the selector actuator 40 shown in FIG. 2. Said turning position represents a neutral starting position for a gear changing movement. When the finger 41 on the actuator is turned into engagement with the reverse gear selector 44 during the gear changing movement, the narrow cam portion 67 is positioned in the recess 43 on the selector 45 simultaneously as the end portion 71 of the spring 70 is brought into engagement against the end edge 49 of the selector 45. During turning, the end portion 71 slides against the end edge 49 to slide the selector 45 axially. Movement of the selector 45 is discontinued when the inner edge of the recess 63 engages against the narrow cam portion 67 on the shift lock 60 (see FIG. 3b). The length of travel thus corresponds to the difference in widths of the wide 66 and narrow 67 portions of the cam 62. According to the invention, said travel is adapted for the sole purpose of actuating the synchronizer of the synchronizing means 16.

Thus actuated, the synchronizer frictionally brakes the rotation of parts in the gearbox, which otherwise does not usually cease as soon as the main clutch has disengaged the input shaft from the engine. Starting from the main clutch, the parts inside and outside the gearbox, which thus have said rotation due to inertia, are a possibly present primary gear (for front-wheel-drive vehicles), input shaft, layshaft with associated laygears, and gears coacting therewith.

In the present case, the synchronizer is disengaged when the engagement step for reverse gear is begun. The finger 41 hereby shifts the selector 44 to the left in FIG. 1, with corresponding movements in the rod 34 and spring 70. From FIG. 3c will be seen the mutual positions of the coacting parts when the engagement step is terminated and reverse gear is engaged. The spring 70 has now been separated from the selector 45, and since there is no force on the latter, the synchronizer has also been disengaged, and the selector 45 has reassumed its original position according to FIG. 3a.

Figure 4:
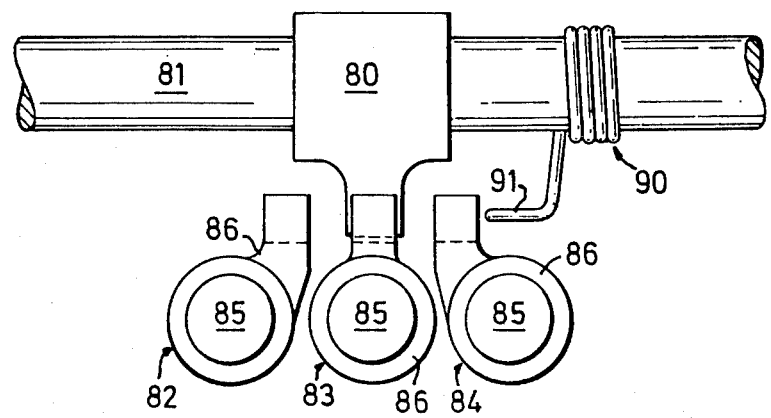
FIG. 4 shows schematically an embodiment where the inventive arrangement is applied to an alternative selector actuating mechanism.
Figure 5:
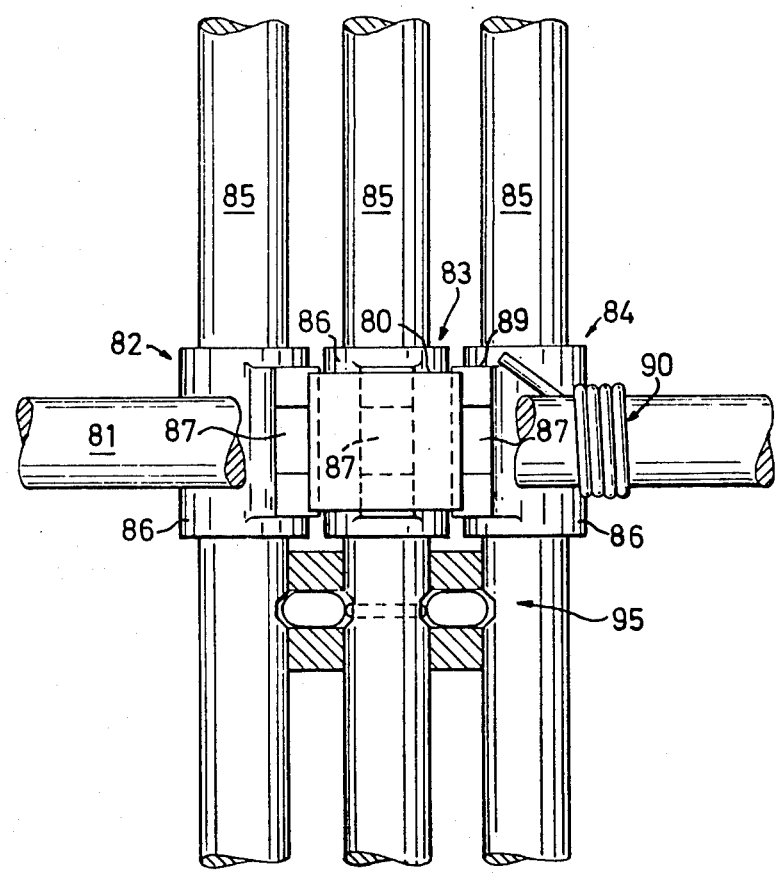
FIG. 5 shows a vertical view of the arrangement according to FIG. 4.

An alternative embodiment of the arrangement according to the invention is shown in FIGS. 4 and 5. The arrangement is shown applied to a gear changing mechanism which has a selector actuator 80 attached to a selector rod 81. The selection step of the gear changing movement is made in the form of an axial movement, and the selector actuator 80 is thereby brought into engagement with one of three selectors 82,83,84. The engagement step takes place by giving the rod 81 and thereby the actuator 80 a turning movement. Each of the selectors 82,83,84 comprises a slidable shaft 85, to which there is attached an arm 86 with a recess 87, intended to coact with the actuator 80 and with a fork (not shown) or corresponding detail for the engagement and disengagement of the gear in question. The selectors 83,84 engage and disengage the forward gears with the help of synchronizing means (not shown), while the selector 82 answers for engaging reverse gear by a shifting movement upwards according to FIG. 5.

In a way corresponding to what has been described with reference to FIGS. 1 and 2, a helix spring 90 is arranged on the selector actuator rod 81. When the selector actuator 80 is brought into engagement with the recess 87 of the reverse gear selector 82 by shifting the rod 81 to the left in FIGS. 4 and 5, an inclined end portion 91 of the spring 90 projecting towards the selector 84 is brought into engagement against an end edge 89 of the selector. During the reverse gear selection step, the spring 90 presses the selector 84 downwards under gliding contact, according to FIG. 5, resulting in that the synchronizer of the appropriate forward gear is actuated to carry out the above-mentioned rotational speed balancing frictional work. A conventional shift lock mechanism 95, arranged in the gearbox casing, allows the selector 84 a limited displacement for engaging the synchronizer, but blocks continued movement, whereby the risk of engaging the forward gear in question is eliminated. Locking the shift of the selector 84 is provided for by the selector 82 acting on the shift lock 95 during the reverse gear engagement step. During said engagement step, the selector 82 is moved upwards according to FIG. 5, as a result of the turning movement in the selector actuator 80. The spring 90 is thereby released from the selector 84, disengaging the synchronizer and allowing the selector 84 to reassume its original position.

The arrangement according to the invention can be varied in a plurality of ways within the purview of the inventive idea. The gripping means exemplified above by a spring 70 can thus be exchanged for a fixed or yielding projection, which is attached to or integral either with the selector actuator, shift lock or other part accompanying the movement of the selector actuator rod during the reverse gear selection step. The projection can thereby be brought into force-transmitting contact either directly or against an optional portion of a selector pertaining to any of the synchronized forward gears, or against a fixed or yielding means attached to said selector. Contact suitably takes place along a surface inclined to the plane of movement, said surface either being formed on the projection or on the selector.

What we claim is:

1. An arrangement for facilitating engaging a reverse gear not having synchronizing means in a gearbox for motor vehicles, said gearbox containing, in addition to said reverse gear, at least one forward gear provided with a synchronizing means, said gears being manually engageable and disengageable by means of a selector actuating means comprising a gear change lever operating at least one selector actuator rod and also comprising at least one selector actuator coacting with said selector actuator rod, whereby a gear changing movement for engaging a gear comprises a selection step and an engagement step, the selection step involving a movement in a first plane for the selector actuating means, and the engagement step involving a movement in a second plane for the selector actuating means, a gripping means connected to the selector actuating means being arranged to obtain force-transmitting connection with a forward gear selector during a part of the selector step for the changing movement into reverse gear, and for giving said forward gear selector a shifting movement so that a synchronizer incorporated in the synchronizing means of the forward gear is engaged, before the engagement step for the reverse gear is actuated characterized in that the force-transmitting connection between the gripping means and said forward gear selector is sprung in the shifting direction of said forward gear selector.

2. An arrangement as claimed in claim 1, characterized in that the gripping means includes said sprung function.

3. An arrangement as claimed in claim 2, characterized in that the force-transmitting connection between the gripping means and said forward gear selector takes place via an inclined surface which transfers the movement of the gripping means in the first plane to a movement of said forward gear selector in the second plane.

4. An arrangement as claimed in claim 3, characterized in that the gripping means is provided with the inclined surface.

5. An arrangement as claimed in any one of the preceding claims, characterized in that the gripping means consists of a wire spring fixedly connected to the selector actuator rod and formed with an end portion projecting towards said forward gear selector.

6. An arrangement as claimed in claims 1, 2, 3, or 4, in which a shift lock in the first plane is fixedly attached to the selector actuator rod, and in the second plane is fixedly attached to the gearbox casing and is formed with a cam coacting with the selector, characterized in that the cam has varying width in the second plane for limiting the sliding movement of said forward gear selector to a predetermined amount during the reverse gear engagement selection step, only the synchronizer of the synchronizing means being affected during said sliding movement.

* * * * *